United States Patent

[11] 3,587,093

| [72] | Inventor | LeRoy H. Paulsen |
| | | 18251 Stewart Ave., Homewood, Ill. |
| [21] | Appl. No. | 366 |
| [22] | Filed | Jan. 2, 1970 |
| [45] | Patented | June 22, 1971 |

[54] INDICATING ARRANGEMENT WITH DIGIT TOTAL FROM ADDITION OR SUBTRACTION
6 Claims, 3 Drawing Figs.

[52] U.S. Cl. .................................................. 340/347 DD,
      35/30, 235/155, 340/147 T, 340/378
[51] Int. Cl. .................................................. H03k 13/24,
      G06f 5/02
[50] Field of Search .......................................... 235/155;
      340/347 DD, 347 P, 147 T, 147 R, 324, 334, 378,
      339; 178/26 R, 26 A; 35/30, 31 R, 31 C, 32

[56] References Cited
UNITED STATES PATENTS

| 2,628,277 | 2/1953 | Spencer | 340/147 T |
| 3,103,006 | 9/1963 | Anthony | 340/347 DD |
| 3,352,031 | 11/1967 | Lindquist | 35/30 |

Primary Examiner—Maynard R. Wilbur
Assistant Examiner—Michael K. Wolensky
Attorney—Evan D. Roberts

ABSTRACT: A total-indicating arrangement comprises an array of digit-indicating lamps and an array of decade-indicating lamps. A plurality of switches are selectively coupled to increase the display total by a value of $2^n$, where $n$ is a function of the position and circuit connections of the particular switch actuated. Upon restoring the previously actuated switch in the binary system the display total is reduced by the same value. The accumulated count can be selectively changed by displacement of the appropriate switches.

PATENTED JUN22 1971 3,587,093
SHEET 1 OF 2
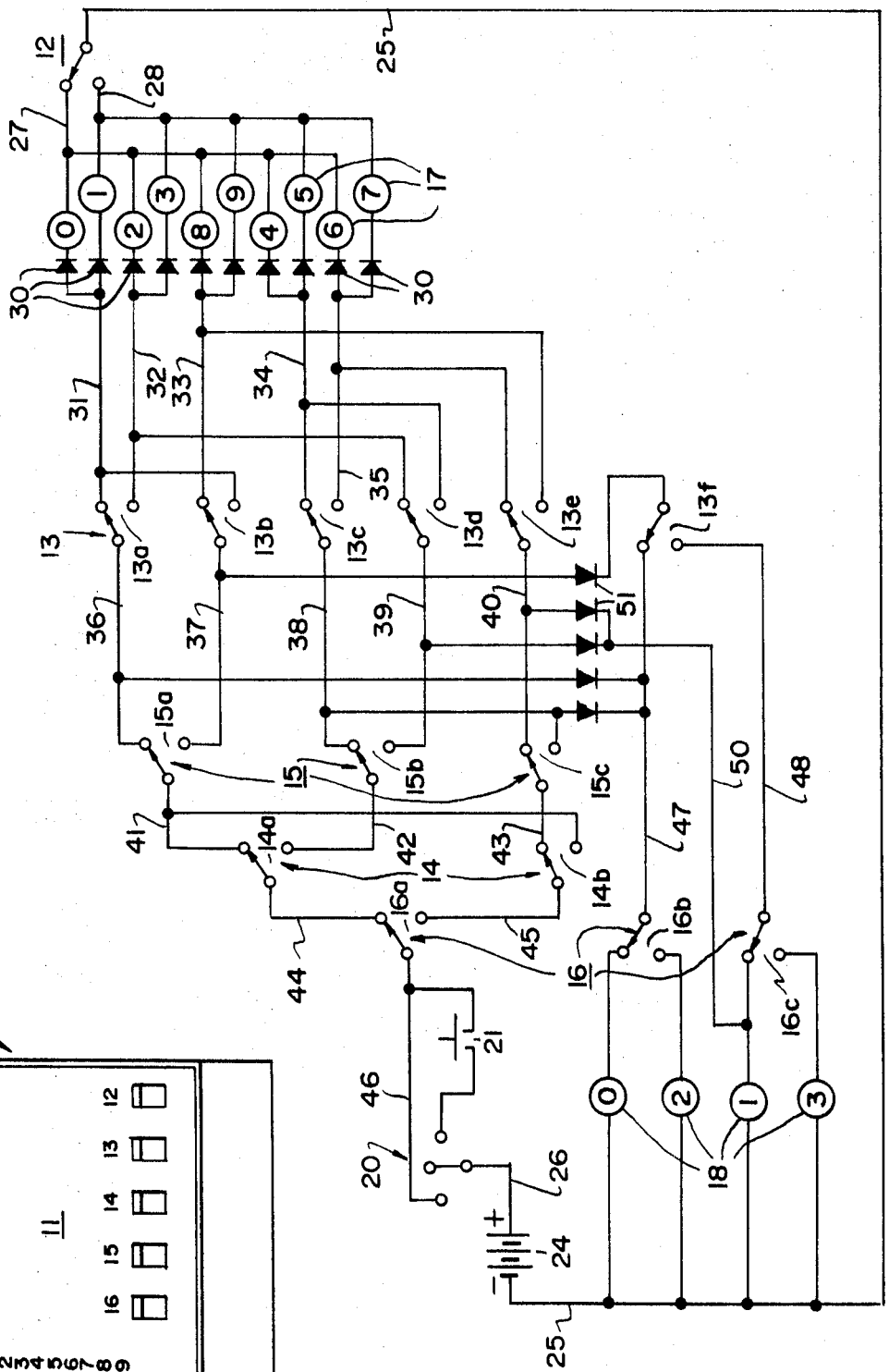
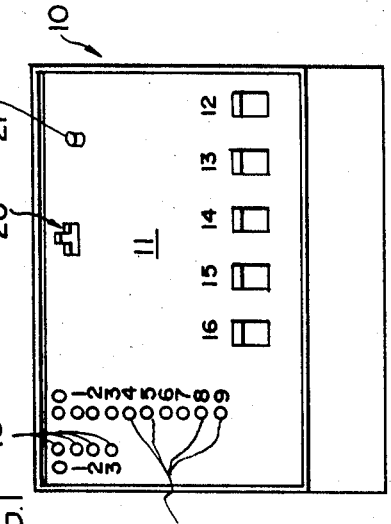
INVENTOR
LEROY H. PAULSEN
BY Evan D Roberts
ATTORNEY

INDICATING ARRANGEMENT WITH DIGIT TOTAL FROM ADDITION OR SUBTRACTION

BACKGROUND OF THE INVENTION

In many fields of education the enhancement of the learning rate and the degree of retention of the subject matter have been enhanced by utilizing newly developed instructional aids and material. Many of these improvements are in the audiovisual field, and in fact the areas under development even include individual student instruction through shared access to a central computer. With such arrangement the particular program is instantly available to the student and the results of his efforts are also displayed immediately. The main drawback to many of these advances is the substantial expense entailed, especially with many school districts at or near the limits of their available funds.

It is therefore a primary consideration of this invention to provide a mathematics instruction system for use in teaching addition and subtraction which is substantially less expensive than presently available units.

It is a corollary consideration of this invention to provide a unit which is simple for the student to use and sufficiently compact for storage in a small space.

SUMMARY OF THE INVENTION

An indicating arrangement constructed in accordance with a preferred embodiment of the invention signifies a digit total upon the addition or subtraction of $2^n$, because the two-position switches utilized in the circuit are essentially binary in structure. The circuit of the invention includes first and second conductors for receiving an energizing potential difference, which may be supplied from a battery, rectifier, or other conventional input arrangement. A plurality of digit indicators, which may be simple lamps, are provided and coupled in a first array. The ±1 switch, like the other value-changing switches, includes a movable contact and a pair of fixed contacts. A first plurality of unidirectional current conducting means, such as diodes, are individually coupled in series with the respective ones of the digit indicators.

The ±2 switch includes a plurality of two-position switches, and in the preferred embodiment there are six of these switches. The fixed contacts of the first five individual switches in the ±2 switch are coupled in a predetermined pattern to the diodes which are series coupled with the digit indicators. The ±8 switch includes three of the individual two-position switches. A plurality of reference conductors, shown as five electrical conductors on the schematic illustration, are individually coupled between the respective fixed contacts of the ±8 switch and the individual movable contacts of the first five two-position switches in the ±2 switch. The ±4 switch includes two two-position switches, of which the fixed contacts are coupled in a predetermined pattern to the movable contacts of the ±8 switch. The movable contacts of the ±4 switch are coupled to the second conductor; this can be done directly or, as shown on the schematic, the coupling can be effected through the ±16 switch when such a switch is added to increase the range of values and combinations available with the system.

At least a pair of decade indicators are provided, and these may also be lamps similar to the digit indicators. One side of each of the decade indicators is coupled to the first conductor. The other sides of decade indicators are coupled to the fixed contacts of the last, or sixth, two-position switch in the ±2 switch assembly. A second plurality of unidirectional current conducting means such as diodes is also provided. Each of these diodes has one side coupled to one of the reference conductors which complete the circuits between the fixed contacts of the ±8 switch and the movable contacts of the ±2 switch. One of the diodes has its other side coupled to the movable contact of the last two-position switch in the ±2 switch assembly, and the remainder of the diodes have their other sides coupled to the sides of the decade indicators remote from the first conductor.

THE DRAWINGS

In the several figures of the drawings like reference numerals identify like components, and in the drawings:

FIG. 1 is a perspective illustration of the inventive system incorporated in a suitable housing;

FIG. 2 is a schematic diagram illustrating circuit components and their respective interconnections in a preferred embodiment of the invention.

DETAILED DESCRIPTION OF THE INVENTION

Figure 3:
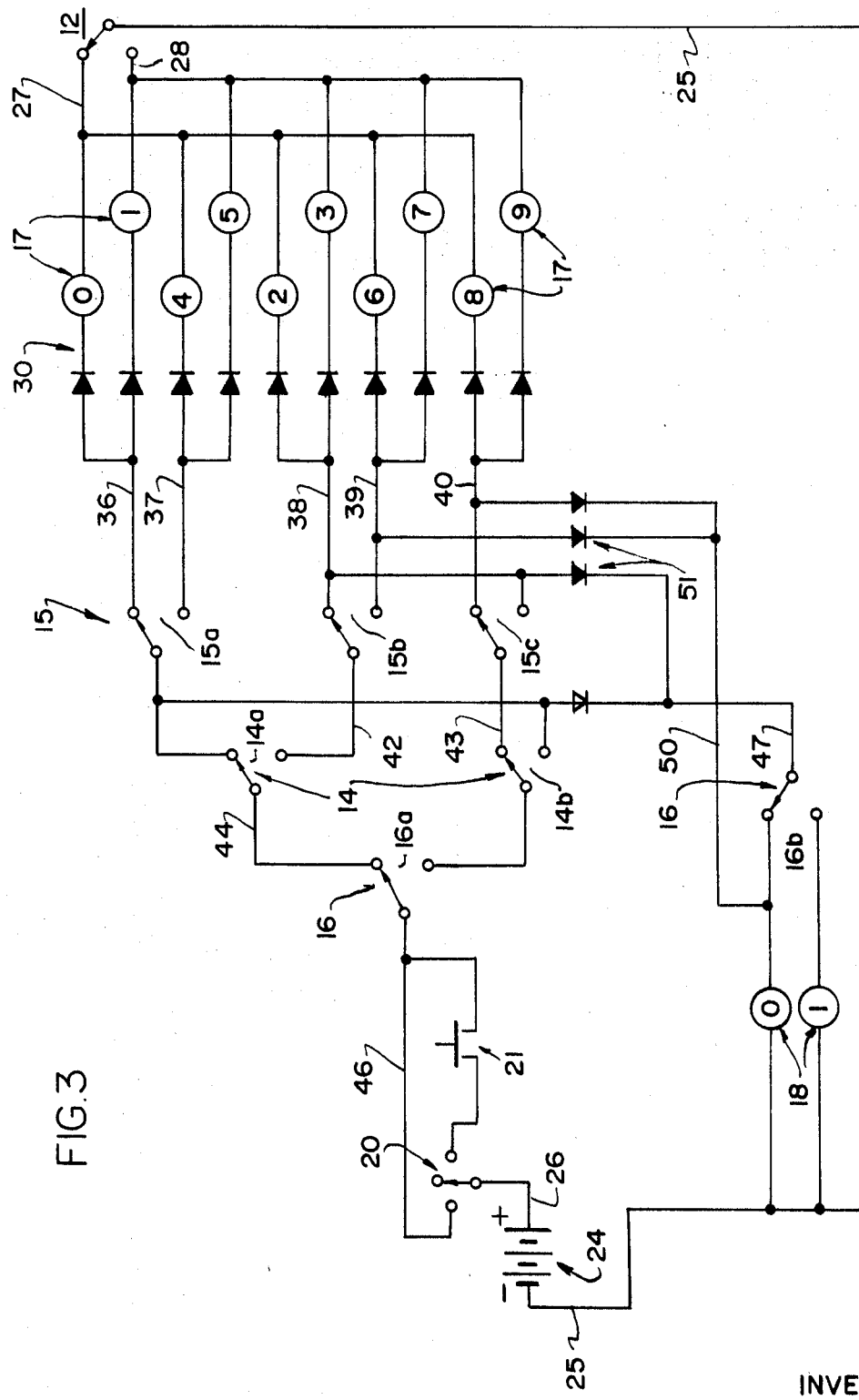
FIG. 3 is a schematic diagram of an alternative embodiment of the invention.

FIG. 1 shows a housing 10 enclosing the circuit components of the invention, with the various switches and indicating lamps depicted on the top surface 11 of the unit. A plurality of two-position switches 12—16 are shown, with their actuating portions extending above the level of surface 10. Switch 12 is the ±1 switch, switch 13 effects the ±2 value change, and so forth to ±16 switch 16. The ±16 switch when actuated adds a value of 16 to the total count, and when returned to its original position subtracts a value of 16 from the total count. An array of 10 digit-indicating lamps 17 is provided to display the unit value of the total count represented at any moment by the particular positions of the switches 12—16 and the circuit connections which are completed and interrupted by the actuation of these switches. An array of decade-indicating lamps 18 is also provided to signify the tens value 1, 2 or 3 so that the total array of lamps can represent values from zero to 31, inclusive. A fourth tens-indicating lamp could be added to signify zero in the tens place, as will be made apparent in the more detailed description hereinafter.

In the upper central portion of surface 11 is a three-position switch 20, which in its center or illustrated position prevents application of the energizing voltage to the electrical circuit. This switch can be displaced to the left to provide continuous energization and thus afford a constant count indication on the lamps 17, 18. In its displacement to the right, switch 20 completes a circuit which can then be extended by the actuation of pushbutton switch 21 to provide momentary lamp illumination or count indication each time the switch 21 is depressed. With this perspective of the physical arrangement of the invention, a detailed description will now be set out in conjunction with FIG. 2.

As there shown a first conductor 25 and a second conductor 26 are coupled to opposite sides of a battery 24. The system illustrated in FIG. 2 was developed for energization from a 4.5-volt potential, which can be supplied by three conventional D batteries coupled in series. Many small and economical rectifier arrangements are also commercially available to provide voltage of 4.5 volts for energizing the inventive system, and the precise energizing source does not affect the arrangement of this invention.

In the upper right portion of FIG. 2 a plurality of digit indicators 17 are shown. Each indicator can be a conventional lamp connected to illuminate a numeral either on an exterior housing or on the lamp itself. To facilitate an understanding of the invention the digit value to be displaced is shown in place of the conventional lamp symbol. The ±1 switch 12 has its movable contact coupled to first conductor 25. A first fixed contact of switch 12 is coupled over conductor 27 to all the even digit-indicating lamps 0, 2, 4, 6 and 8. The other fixed contact of switch 12 is coupled over conductor 28 to all the odd digit-indicating lamps 1, 3, 5, 7 and 9. Those skilled in the art will appreciate that in the illustrated position, or the nonoperated position of ±1 switch 12, only an even count can be displayed and the precise even digit illuminated will depend upon the settings of the other switches 13—16. If switch 12 is displaced to engage the other fixed contact coupled to conductor 28, the digit value will be increased by one. When switch 12 is returned to its illustrated position the count will be returned, or one unit will be subtracted from the previously accumulated count.

A first plurality of current conducting means, shown as an array of diodes 30, are individually coupled in series with the respective digit indicating lamps 17. The ±2 switch 13 includes six individual two-position switches, designated 13a—13f. The fixed contacts of the ±2 switch assembly, specifically the fixed contacts of the switch units 13a—13e, are coupled over conductors 31—35 to the diode array 30 in a predetermined pattern. Each of conductors 31—35 is coupled to an adjacent pair of the diodes 30, as is evident from the drawing. Each of the conductors 31—35 is coupled to two different fixed contacts in the array of switches 13a—13e. By way of example, conductor 34 extends from the two diodes coupled to the 4 and 5 digit-indicating lamps to the upper fixed contact of switch 13c and to the lower fixed contact of switch 13d.

The ±8 switch 15 comprises three two-position switches 15a, 15b and 15c. A plurality of reference conductors 36—40 are utilized as shown to intercouple the movable contacts of switches 13a—13e in the ±2 switch with the fixed contacts of the switches in the ±8 switch. The ±4 switch 14 includes only two individual switches 14a and 14b. The fixed contacts of switches 14a, 14b are coupled in a predetermined pattern over conductors 41, 42 and 43 to the individual movable contacts in the ±8 switch. In the illustrated embodiment a ±16 switch is also provided, and this switch includes three two-position switches 16a, 16b and 16c. Switch 16a has its two fixed contacts coupled over conductors 44, 45 to the movable contacts of ±4 switch 14. The other two sections of the ±16 switch are utilized, as will be described shortly, in conjunction with the decade indicators 18.

The movable contact of switch 16a is coupled over conductor 46 to one fixed contact of the three-position switch 20, so that when the movable contact of switch 20 is displaced to the left an energizing circuit is continuously extended from conductor 26 over switch 20 and conductor 46 to the movable contact of switch 16a. In the alternative, with switch 20 displaced so that the movable contact engages the right-hand contact which is coupled in series with momentary pushbutton switch 21, the energizing circuit is only completed when the pushbutton switch 21 is depressed. In the illustrated position of switch 20 the system is not energized, and cannot be energized by depression of pushbutton switch.

Each of the decade-indicating lamps 18 is represented by the numeral it signifies rather than the conventional electrical symbol, to aid in understanding the inventive circuit. Those skilled in the art will appreciate that a resistor can be connected in place of the uppermost or 0-indicating lamp, so that only the decade values 1, 2 and 3 will be present in the circuit as shown in FIG. 1. In the embodiment of FIG. 2 the left side of each decade indicator 18 is coupled to first conductor 25. Were the ±16 switch omitted, only the 0 and 1 decade lamps would be present and they would be coupled continuously over conductors 47 and 48 to the fixed contacts of the last two-position switch 13f in the ±2 switch assembly. However, with the ±16 switch included, the fixed contacts of switch section 16b are coupled to the 0 and 2 lamps of the decade indicators, or to the dummy resistor and the 2 indicator lamp. The movable contact of switch 16 b is coupled over conductor 47 to the upper fixed contact of switch 13f. The lower fixed contact of this switch is coupled over conductor 48 to the movable contact of switch 16c. The lower contact of switch section 16c is coupled directly to the 3 indicating decade lamp, and the upper fixed contact of this switch is coupled both to the 1 lamp of the tens indicators and, over conductor 50, to one side of a pair of diodes in the array of diodes 51. These diodes or unidirectional current conducting means complete the circuit between individual reference conductors 36—40 and the decade indicating lamps.

With the circuit connected as shown, with the switches in their illustrated positions, a battery or other voltage source is first connected between conductors 25, 26. Then switch 20 is displaced to the left to energize the system, but only the 0 lamp in the digits array 17 will be illuminated at this time. (The 0 lamp in the decade array will also be illuminated if one is provided.) If the 4 switch (for example) is then displaced the 0 unit indicating lamp of the array 17 will be extinguished, and the 4 lamp will be illuminated. If the 16 and 1 switches are also displaced, the 4 lamp will be extinguished, the 2 decade-indicating lamp will be lighted, and the 1 digit-indicating lamp will be energized. If the 4 switch is returned to its nonoperated position in a subtraction operation, the previously illuminated lamps will be extinguished, and the 1 decade-indicating lamp and the 7 digit-indicating lamp will also be lighted. In a similar manner the others of the 32 available combinations can be selected to represent values from 0 through 31 on the two indicator arrays 17, 18. It is thus manifest that a compact and economical instructional system is provided with a high interest and educational value.

FIG. 3 illustrates another embodiment of the invention, which is arranged to accumulate a count of 16, or to indicate the values 0—15. The former ±2 switch 13 in FIG. 2 has been removed, together with the conductors formerly connecting the fixed terminals of switch 13 to the diodes 30. Accordingly, as shown in FIG. 3, the conductors 36—40 extend the electrical connections from the fixed contacts of switch 15 to the diodes 30. With the circuit arrangement of FIG. 3, switch 16, which was previously the ±16 switch, is now the ±8 switch, and the switch portion 16c has been omitted because there is no requirement for switching between the additional pair of decade lamps. Switch 14, previously the ±4 switch, now functions as the ±2 switch, and switch 15, previously the ±8 switch, now operates as the ±4 switch. Those skilled in the art will readily understand and appreciate the operation of the circuit depicted in FIG. 3 from the previous explanation given in connection with FIG. 2. The arrangement of FIG. 3, while more compact and less expensive than that of FIG. 2, cannot accumulate the same count and thus does not have the same range of addition and subtraction capability as does the arrangement of FIG. 2.

While only particular embodiments of the invention have been described and illustrated it is manifest that various modification and alterations may be made therein. It is therefore the intention in the appended claims to cover all such modifications and alterations as may fall within the true spirit and scope of the invention.

What I claim is:

1. An indicating arrangement for signifying a digit total upon the addition or subtraction of $2^n$, comprising a binary circuit including first and second conductors for receiving an energizing potential difference, a plurality of digit indicators, a ±1 switch having a movable contact coupled to the first conductor, a first fixed contact coupled to all the even digit indicators, and a second fixed contact coupled to all the odd digit indicators, a first plurality of unidirectional current conducting means, each coupled in series with one of said digit indicators, a ±4 switch, having a plurality of two-position switches each with a movable contact and first and second fixed contacts, a plurality of reference conductors, individually coupling the fixed contacts of said ±4 switch in a predetermined pattern to said unidirectional current conducting means, a ±2 switch, having a pair of two-position switches each including a movable contact and a pair of fixed contacts, means for coupling the fixed contacts of the ±2 switch to the movable contacts of the ±4 switch in a predetermined pattern, a ±8 switch, having at least first and second two-position switches each including a movable contact and a pair of fixed contacts, means for coupling the fixed contacts of the first two-position switch in the ±8 switch to the movable contacts of the ±2 switch, means for coupling the movable contact of the first two-position switch in the ±8 switch to said second conductor, at least two decade indicators, both having one side coupled to the first conductor, means for coupling the other side of said decade indicators to the fixed contacts of the second one of the two-position switches in the ±8 switch, and a second plurality of unidirectional current conducting means, each having one side coupled to one of said reference conductors, at least one of said second plurality of unidirectional current conducting means having its other side coupled to the movable contact of said second two-position switch in the ±8 switch, and others of said second plurality of unidirectional current conducting means having their other sides coupled to said other sides of the decade indicators.

2. An indicating arrangement as claimed in claim 1 and further comprising an additional switch assembly including six two-position switches each with a movable contact and first and second fixed contacts, with the fixed contacts of the first five two-position switches being coupled to said first plurality of unidirectional current conducting means, and the movable contacts of the same five two-position switches being coupled over said reference conductors to the fixed contacts of the previous ±4 switch, such that said additional switch assembly now operates as the ±2 switch, the previous ±4 switch now operates as the ±8 switch, the previous ±2 switch now operates as the ±4 switch, and the previous ±8 switch now operates as the ±16 switch, a third two-position switch included in the ±16 switch, previously the ±8 switch, a pair of additional decade indicators for signifying the decade values 2 and 3, each additional decade indicator also having one side coupled to said first conductor, means for coupling the other sides of all the decade indicators to the fixed contacts of the second and third two-position switches in the ±16 switch, and means for coupling the movable contacts of the second and third two-position switches in the ±16 switch to the fixed contacts in the sixth one of the two-position switches in the added ±2 switch.

3. An indicating arrangement as claimed in claim 1 and further comprising a three-position switch, operable to provide selection of on, off, and pushbutton positions, including a movable contact coupled to said second conductor, a first fixed contact representing the on position, coupled to the movable contact of the first two-position switch in the ±8 switch, a second fixed contact, left blank to represent the off position, and a third fixed contact representing the pushbutton position, and a pushbutton switch coupled between said third fixed contact and said movable contact of the first two-position switch in the ±8 switch to provide momentary energization of the indicating arrangement.

4. An indicating arrangement for signifying a digit total upon the addition or subtraction of $2^n$, comprising a binary circuit including first and second conductors for receiving an energizing potential difference, a plurality of digit-indicating units, a ±1 switch having a movable contact coupled to the first conductor, a first fixed contact coupled to all the even digit-indicating units, and a second fixed contact coupled to all the odd digit-indicating units, a first array of 10 diodes, each coupled in series with one of the digit-indicating units, a ±2 switch, having six two-position switches each with a movable contact and first and second fixed contacts, means for coupling the fixed contacts of the first five switches in the ±2 switch in a predetermined pattern to the diodes in the first array, a ±8 switch having three two-position switches each with a movable contact and first and second fixed contacts, five reference conductors, individually coupled between respective fixed contacts of the ±8 switch and the movable contacts of the first five two-position switches in the ±2 switch, a ±4 switch, having two two-position switches each including a movable contact and a pair of fixed contacts, means for coupling the fixed contacts of the ±4 switch to the movable contacts of the ±8 switch in a predetermined pattern, a ±16 switch, having three two-position switches each with a movable contact and a pair of fixed contacts, means for coupling the fixed contacts of the first two-position switch in the ±16 switch to the movable contacts of the ±4 switch, and for coupling the movable contact of the first two-position switch in the ±16 switch to said second conductor, four decade-indicating units for signifying the values 0, 1, 2 and 3, each unit having one side coupled to said first conductor, means for coupling the other sides of the four decade-indicating units to the fixed contacts of the second and third two-position switches in the ±16 switch, a pair of decade conductors, respectively coupled between the fixed contacts of the sixth two-position switch in the ±2 switch and the movable contacts of the second and third two-position switches in the ±16 switch, and a second array of five diodes, each having one side coupled to one of the five reference conductors, the first and second of said diodes having their other sides coupled to one of the decade conductors, the third and fourth of said diodes having their other sides coupled to said other side of the 1-denoting decade indicator unit, and the fifth of said diodes having its other side coupled to the movable contact of the sixth two-position switch in the ±2 switch.

5. An indicating arrangement as claimed in claim 4 in which said means for coupling the movable contact of the first two-position switch in the ±16 switch to said second conductor comprises a control switch, for displacement to energize and deenergize the indicating arrangement.

6. An indicating arrangement as claimed in claim 5 in which said control switch comprises a three-position switch having a movable contact coupled to said second conductor, a first fixed contact representing the on position, coupled to the movable contact in the first two-position switch of the ±16 switch, a second fixed contact left blank to represent the off position, and a third fixed contact representing the pushbutton position, and a momentary energization switch coupled between said third fixed contact and the movable contact in the first two-position switch of the ±16 switch.